United States Patent
Mahajan

(10) Patent No.: US 9,137,647 B2
(45) Date of Patent: Sep. 15, 2015

(54) WIRELESS MACHINE TO MACHINE (M2M) COMMUNICATION

(75) Inventor: Amit Mahajan, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 676 days.

(21) Appl. No.: 13/473,291

(22) Filed: May 16, 2012

(65) Prior Publication Data

US 2013/0311554 A1    Nov. 21, 2013

(51) Int. Cl.
*G06F 15/16* (2006.01)
*H04W 4/12* (2009.01)
*H04W 4/00* (2009.01)
*H04W 4/02* (2009.01)

(52) U.S. Cl.
CPC ............ *H04W 4/12* (2013.01); *H04W 4/005* (2013.01); *H04W 4/02* (2013.01); *H04W 4/023* (2013.01)

(58) Field of Classification Search
CPC .................... H04L 27/2605; H04L 63/30
See application file for complete search history.

(56) References Cited

U.S. PATENT DOCUMENTS

| | | | |
|---|---|---|---|
| 7,774,008 B2 * | 8/2010 | Benaouda et al. | 455/466 |
| 7,774,231 B2 | 8/2010 | Pond et al. | |
| 2007/0055640 A1 | 3/2007 | Dababneh et al. | |
| 2008/0114675 A1 | 5/2008 | Ward | |
| 2008/0224891 A1 | 9/2008 | Ehrke et al. | |
| 2010/0030708 A1 | 2/2010 | Ward, II | |
| 2011/0053619 A1 | 3/2011 | Shaheen et al. | |
| 2012/0057476 A1 | 3/2012 | Chan et al. | |
| 2012/0237908 A1 * | 9/2012 | Fitzgerald et al. | 434/236 |

OTHER PUBLICATIONS

Shoeb S. Sheikh et al., "Design and Implementation of Wireless Automatic Meter Reading System," International Journal of Engineering Science and Technology, vol. 3, No. 3, Mar. 2011.
Jin Zhu et al., "A Novel Automatic Utility Data Collection System using IEEE 802.15.4-Compliant Wireless Mesh Networks," Proceedings of The 2008 IAJC-IJME International Conference.
Cisco Outdoor Wireless Solutions-Automated Meter Reading, C45-398067-00, Mar. 2007.

\* cited by examiner

*Primary Examiner* — Hua Fan

(57) ABSTRACT

In a Machine-to-Machine (M2M) communication, a data message from an M2M device is received over a mobile communication network at a server. The received data message includes a Mobile Station Identifier (MSID) number of the M2M device; GPS coordinates of the M2M device determined by the M2M device; and utility usage information. A utility account is identified based on the MSID. The distance between a pre-programmed location of the M2M device and the GPS coordinates received from the M2M device is calculated. The utility usage information is stored in the memory of the server upon determining that the distance is within a predetermined threshold.

22 Claims, 6 Drawing Sheets

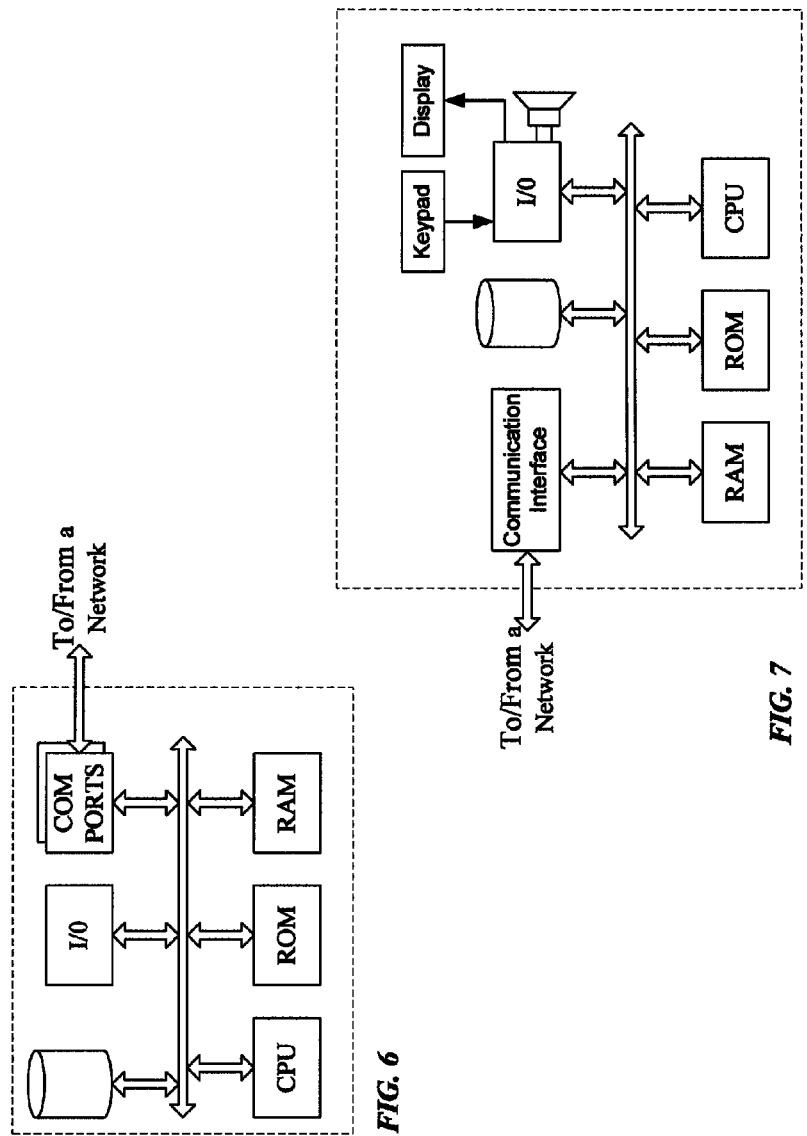

WIRELESS MACHINE TO MACHINE (M2M) COMMUNICATION

BACKGROUND

In our modern society, there is an increasing trend to deploy Machine-to-Machine (M2M) communications so as to automate a variety of data gathering operations and/or to provide automatic data communications in support of a variety of other automated applications increasingly demanded by consumers and service providers alike. Advanced metering systems (AMSs) through Automated M2M communications, for example, allow utility companies to automatically read utility meters, which eliminates the need for personnel to visit customer premises and manually read meters, while providing additional functionality and features to both users and providers. Today, some utility companies, for example, collect data using data communications with meter equipment as utility personnel "walk-by" or "drive-by." Increasingly, there is a trend to use of networked communications to eliminate the need for personnel to even visit the customer neighborhoods.

Many networked M2M communications have utilized the public switched telephone network (PSTN). However, more recently, M2M communications have begun to use communication services offered by public mobile wireless communication networks. For example, M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by 3GPP2 and the institute of Electrical and Electronic Engineers (IEEE).

Wireless carriers have developed a text messaging service known as Short Message Service (SMS). The SMS service transmits text messages for display on the mobile stations. In a typical implementation, SMS communications to/from a mobile station use a signaling channel over the air-link and use out-of-band signaling resources of the mobile phone network for transport to/from a server platform referred to as a SMSC (Short Message Service Center). The SMSC, for example, receives packet communications containing text messages and forwards the messages via the signaling resources and the signaling channels to the appropriate mobile stations. The SMSC will also receive similar messages from the mobile stations and forward them to servers or terminal devices accessible via an Internet Protocol (IP) packet data network. Although the transport for the SMS messaging takes different forms, later versions of 3G and 4G wireless networks still offer the same or similar short messaging services for the still popular text message communications.

In a public wireless mobile telephone network, including networks that offer the SMS service, each wireless subscriber (whether it be an end-user or an end-device as in the case of M2M) is assigned a valid telephone number, often referred to as a Mobile Directory Number (MDN), which is used as a destination address to terminate call routing for call or message delivery. The MDN may also be used to identify the subscriber and verify subscription profile information during communications through the network. In developing any new wireless products or services through such a network, the MDN is used for implementation. Accordingly, data services provided for utility billing or the like utilize a device that is identified with a specific MDN number.

However, relying purely on an MDN to support M2M applications is not without concerns. For example, as traditional utility meters are replaced with M2M communication based AMSs that use MDN numbers for identification, one problem that is often overlooked is that the new meters are sometimes installed at incorrect locations. Currently, there is no effective system or method to correlate an identification number with a geographic determination for a remote utility reading.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 illustrates a network or host computer.

FIG. 7 depicts a computer with user interface elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable automatic utility "meter reading," that is to say to accumulate information regarding usage of a utility at a customer location, through M2M communication based on a unique identification number of an M2M device that obtains the utility usage information for the customer location. The correct M2M device is further confirmed by a geographical determination.

In the detailed examples discussed below, M2M communications utilize an intrinsic data communication service of a public mobile/wireless communication network. In one example, SMS or similar text messaging service is used. A specific Mobile Station Identifier (MSID), such as an MDN, Mobile Identifier Number (MIN), or the like, is assigned to each of the many remote M2M client devices. Text message transmissions originating at an M2M client device use the MSID assigned to the particular device to transmit information related to utility usage to a central database, e.g. maintained by or accessible to a server. The central server authenticates the client based on the MSID and an additional geographical determination.

For normal mobile stations, the MDN is the actual directory number assigned to the M2M device. For example, it is the published 'telephone number' for all communications to and from the M2M device. The MIN is used for purposes of network signaling to/from the mobile station. The MIN may be the same as the MDN; however, the MIN number may be different from the directory number MDN assigned to the mobile station, for example, in a ported telephone number scenario. The MSID used for the M2M wireless client could be a valid telephone number such as a valid MDN. However, various types of MSIDs may be used, and it may be preferable to use an MSID type that is not a valid MDN, since such MDNs are an increasingly scarce resource. Common examples of alternative types of MSIDs include a MIN and an International Mobile Station Identifier (IMSI). For ease of discussing a specific example below, however, we will generally assume that the MSID used is an MDN unless described otherwise.

Figure 1:
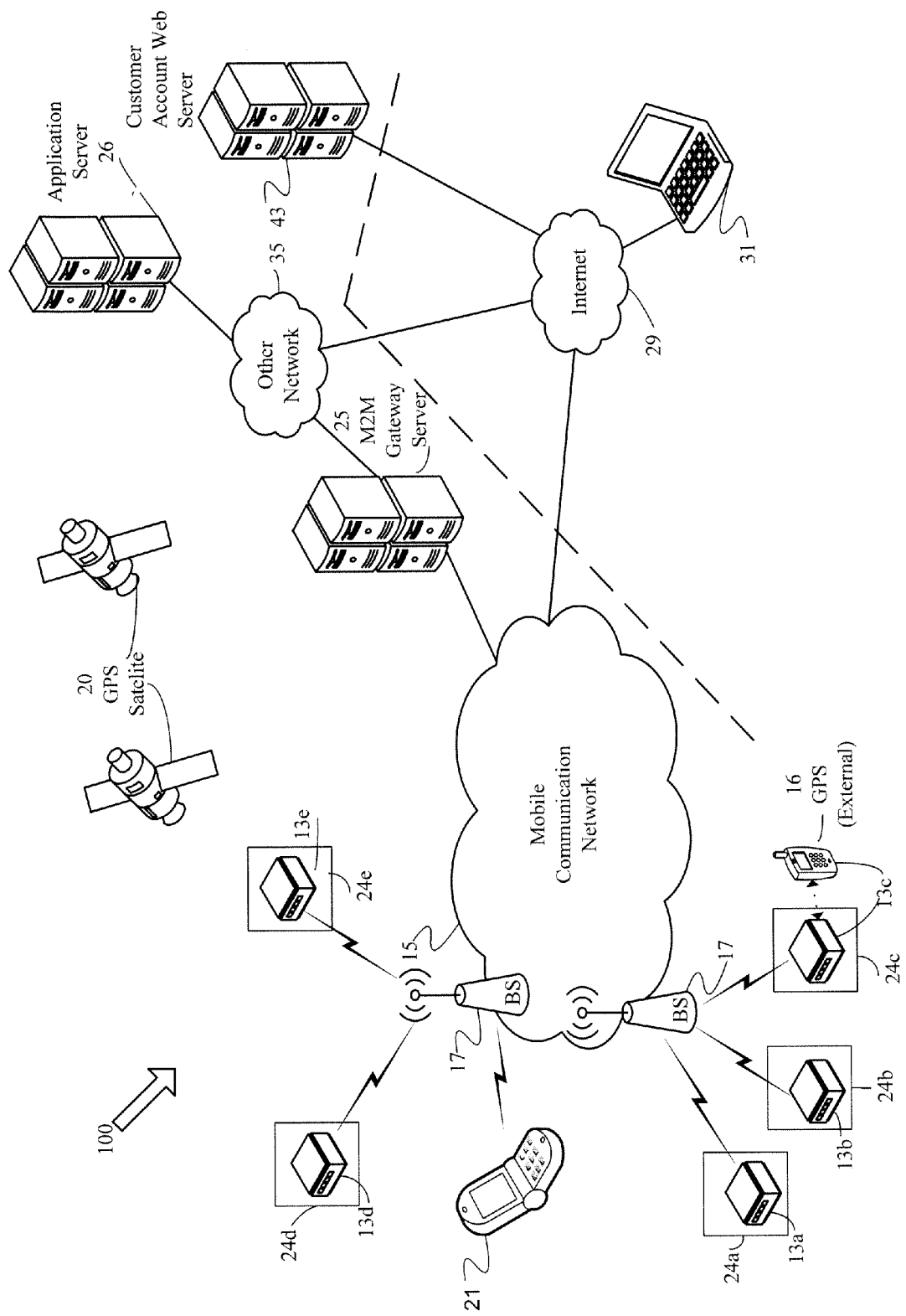
FIG. 1 illustrates a system providing a framework for M2M services.

Reference now is made in detail to the examples illustrated in the accompanying drawings and discussed below. FIG. 1 depicts a communication system 100 providing a framework for M2M services using wireless data communication capabilities of a mobile communication network. Communication system 100 includes a number of M2M devices 13a to 13e (collectively referred to as "M2M devices 13"); one or more base stations 17; a mobile communication network 15; a gateway server 25; one or more application servers 26 accessed through a data network 35; a customer account web server 43; personal computer 31; and one or more GPS satellites 20. Five M2M devices 13, two base stations 17, two GPS satellites 20, and a single personal computer 31. In practice, there may be more M2M devices 13, communication networks 15, application servers 26, personal computers 31, etc.

Communications for the M2M function extend between a number of M2M devices 13a to 13e and one or more application servers 26. M2M devices 13 may be installed at a fixed remote location, such as a particular location on a customer premises. For example, a customer is a utility account holder who pays for a utility service. A utility is a consumable that is delivered through a fixed infrastructure, such as electricity, gas, or water.

Each application server 26 provides the M2M capability and function of an M2M remote receiver of utility information for a utility customer (i.e., subscriber). Thus, the M2M devices 13a to 13e include (or communicate with) local meters that perform the function of each determining the amount of relevant resources that the respective utility customer (i.e., the utility account holder who with and pays for a utility service) at a corresponding location (e.g., 24a to 24e) has used.

Figure 2:
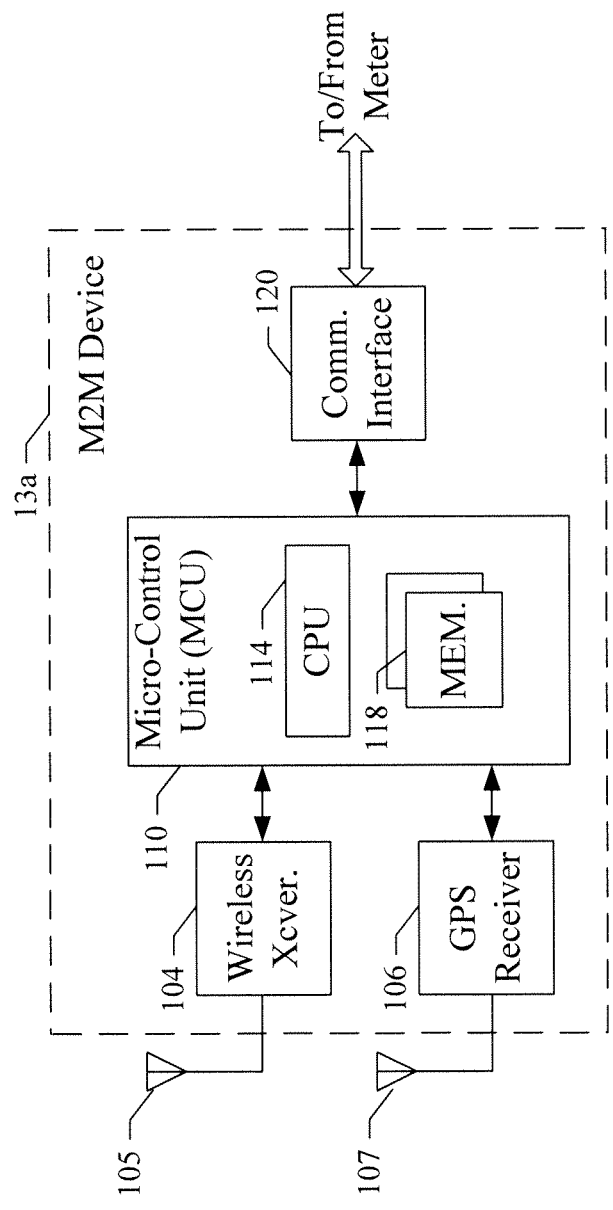
FIG. 2 illustrates a simplified block diagram of an M2M device

FIG. 2 illustrates a simplified block diagram of an M2M device 13a. The M2M device 13a includes a wireless transceiver 104, a GPS receiver 106, a micro-control unit 110, and a communication interface 120. The transceiver 104 provides two-way wireless communication of information, such as digital message information, in accordance with the technology of the mobile communication network 15. In the example of FIG. 2, the transceiver 104 sends and receives a variety of signaling messages in support of data services provided via the mobile the communication network 15. Each transceiver 104 connects through RF send and receive amplifiers (not separately shown) to its antenna 105. In the example, the transceiver 104 is configured for RF communication in accord with a digital wireless protocol, such as the current 3GPP2 (e.g. CDMA) and 3GPP protocols (e.g., GSM and LTE) consistent with 3G, 4G, and beyond.

The M2M device 13 further includes a micro-control unit (MCU), which is an integrated circuit (IC) including a CPU 114 and memory 118 that performs various signal processing functions, including processing of digitized information from and to the transceiver 104. For example, the MCU 110 receives outbound data and provides digitally processed transmit data to the wireless transceiver 104 for transmitting them through an RF send amplifier (not shown) to its antenna 105. Similarly, for reception of data, the MCU 110 receives receive data from its transceiver 104 via RF receive amplifier (not shown) and its antenna 105, processes them. The MCU 110 also receives GPS information from a GPS receiver 106 (via antenna 107). Thus, the M2M device 13a includes a global positioning receiver (GPS) that receives and processes signals from GPS satellites (e.g., 20 in FIG. 1) to determine its geographic location. As discussed in a later section, in one example, the GPS receiver 106 is located outside the M2M device 13a for better reception.

Accordingly, the MCU 110 serves as a programmable controller or processor for the M2M device 13a, in that it controls all operations of the M2M device 13a in accord with programming that it executes, for all normal operations, and for operations involved in determining utility usage information and determining GPS location consideration here. In the example of FIG. 2, the M2M device 13a includes memory 118 (e.g., flash), for storage of various "software" or "firmware" program routines and mobile configuration settings, such as mobile telephone number (MTN or MDN), history of SMS sent and received, etc. The memory 118 may also include a non-volatile read only memory (ROM) or volatile random access memory (RAM) for a working data processing memory. In a present implementation, the memory 118 stores firmware such as a boot routine, device driver software, an operating system, call processing software, and any of a wide variety of other applications, such as short message service software. The memory 118 also stores various data, such as telephone numbers and server addresses, downloaded data, and various data input by the customer (e.g., account holder who pays the utility bill). Programming stored in the memory 118, sometimes referred to as "firmware," is loaded into and executed by the CPU 114.

As outlined above, the M2M device 13a includes an MCU 110, and programming stored in the memory 118 configures the MCU 110 so that the M2M device 13a is capable of performing various functions, including in this case the functions involved in the technique for determining utility information, determining a GPS location, and communicating with a remote application server. The utility information is provided by one or more utility meters (not shown) through a communication interface 120. In one example, the one or more utility meters are part of the M2M device 13a.

In one example, a radio frequency (RF) repeater is used (not shown) to boost a mobile communication network 15 signal. An RF repeater is a type of bi-directional amplifier (BDA) for boosting the mobile communication network 15 reception to a local area by using a reception antenna, a signal amplifier, and/or an internal rebroadcast antenna.

The M2M devices 13a to 13e and the M2M application server 26 communicate data via an Internet Protocol (IP) data network 35, and a public data network (PDN) shown as a mobile traffic network 15 in the example of FIG. 1. The gateway server 25 is an entity within the wireless network 15 that acts as an intermediary between the wireless service provider network 15 and the application server 26 performing the remote meter reading function.

The mobile communication network 15 may include any type of network, such as a wide area network (WAN), a local area network (LAN), a public switched telephone network (PSTN), a cellular network, the Internet, a private network, or a combination of networks. Network 15 may provide services and/or resources to facilitate communication between M2M devices 13/base stations 17 and M2M application server 26. In one example, the mobile communication network 15 allows text messaging between M2M devices 13a to 13e and similar messaging with other devices via the Internet. For example, SMS can be sent over Code Division Multiple Access (CDMA), GSM, or LTE. The network 15 typically offers a variety of other data services to mobile stations (e.g., 21) via the Internet, such as downloads, web browsing, e-mail, etc.

The mobile communication network 15 typically is implemented by a number of interconnected networks. Hence, the overall system 100 may include a number of radio access networks (RANs), as well as regional ground networks interconnecting a number of Radio Access Networks (RANs) and a wide area network (WAN) interconnecting the regional ground networks to core network elements, such as the application server 26. A regional portion of the network 15, such as that serving M2M devices 13a to 13e typically includes one or more RANs and a regional circuit and/or packet switched network and associated signaling network facilities.

Physical elements of a RAN, operated by one of the mobile service providers or carriers, include a number of base stations, represented in the example by the base stations (BSs) 17. Such base stations 17 typically comprise a base transceiver system (BTS) which communicates via an antennae system at the site of base station 17 and over the air-link with mobile stations 21 and one or more of the M2M devices 13a to 13e within range. Each base station 17 typically includes a BTS coupled to several antennae mounted on a radio tower within a coverage area often referred to as a "cell." The BTS is the part of the radio network that sends and receives RF signals to/from the mobile devices that the base station currently serves. For such radio communications, each M2M device 13a to 13e has a compatible wireless transceiver.

The radio access networks also include a traffic network represented generally by the cloud at 15, which carries the user communications for the M2M devices 13a to 13e between the respective base stations 17 and other elements with or through which the M2M devices 13a to 13e communicate. Individual elements such as switches and/or routers forming the traffic network 15 are omitted here form simplicity.

The traffic network portion of the mobile communication network 15 connects to a public packet switched data communication network, such as the network commonly referred to as the "Internet" shown at 29. Packet switched communications via the traffic network 15 and the Internet 29 may support a variety of user services through the network 15, such as mobile device communications of text and multimedia messages, e-mail, web surfing or browsing, programming and media downloading (including audio and video), etc. For example, the application server 26 may be able to receive messages from and send messages to user terminal devices, such as personal computers, either directly (peer-to-peer) or via various servers (not separately shown). The drawing shows one such user terminal device as a personal computer (PC) or server 31, by way of example. For purposes of discussing notification messages, some notifications may entail an e-mail message transmission of the notification that a utility account holder's can view on their terminal, such as PC 31 via the Internet 29.

The M2M devices 13a to 13e are generally at fixed remote locations respectively, e.g. at a home or apartment or at a commercial/industrial establishment (24a to 24e). To enable the communication of data for the M2M devices 13a to 13e, each such device includes (or is attached to) a wireless transceiver. Accordingly, each M2M provides network access capability, in this example, to the wireless digital network 15. Physically, each M2M device 13a to 13e includes features similar to selected components of a mobile telephone station, such as mobile station 21, including the appropriate transceiver components for communication through the network but without the elements for voice input/output and vocoder and transceiver elements for communications of voice information.

In the outbound direction, each M2M device 13a to 13e processes its utility data and sends it as a text message to the application server 26. Each M2M device 13a to 13e includes its MSID (e.g., MDN) in the transmission. Further, each M2M device 13a to 13e includes its GPS coordinates, if such coordinates are available (i.e., GPS 16 successfully communicates with respective GPS satellites 20). In one example, the GPS receiver 16 for an M2M device 13c is placed outside the house/building/location 24c (i.e., separate from the local M2M device 13c) to improve GPS satellite 20 reception.

Each text message to the application server 26 may also include the address of the house/building/location (e.g., 24a); date, time of the transmission; and usage timeframe (e.g., the start and end of the usage cycle). In one example, upon receiving the text message, the application server 26 sends an acknowledgement text message back to the respective M2M device (e.g., 13a) that sent the text message to the application server. The acknowledgment confirms that the application server received the text message and that the infoiriiation therein has been successfully processed. If no acknowledgment text message is sent back to the respective M2M device (e.g., 13a) it may indicate one of several things. For example, it may indicate that the received text message from the M2M device (e.g., 13a) was corrupted and thus not processed. Lack of an acknowledgment may also indicate that the text message from the M2M device (e.g., 13a) was simply not received by the application server 26. When an acknowledgment message is not received by the M2M device (e.g., 13a) within a predetermined time, the respective M2M device waits for a second predetermined time (e.g., 24 hours) and sends another text message with substantially similar information to the original text message (e.g., address, date, time of the transmission, etc.).

In one example, an M2M device (e.g., 13a) has GPS coordinates of its location pre-programmed (i.e., stored) within its memory. The M2M device determines whether the pre-programmed and the current GPS readings are within a predetermined threshold distance before it sends a text message to the application server 26. For example, the threshold distance is programmable by the utility company. Upon determining that the pre-programmed GPS coordinates are within a threshold distance (e.g., set to 50 m) of the GPS coordinates provided by the GPS receiver, the M2M device (13a in this example) sends a text message as discussed above. However, upon determining that GPS coordinates are not within a threshold distance, the M2M device sends an error notification to the application server 26. For example, the error notification may be a text indicating to the application server that the GPS coordinates do not match the pre-programmed GPS coordinates or are not within a predefined threshold distance of the M2M device. In one example, the GPS coordinates determined by the M2M device are included in the notification. In one example, upon receiving any text message from an M2M device, the application server 26 sends an acknowledgement text message back to the respective M2M device that sent the text message, as discussed above.

In one example, if an error notification is received by the application server 26a, a technician assigned to the area corresponding to the received GPS coordinates is notified via text, e-mail, calendar entry of the problem, or the like. The notification to the technician may include the GPS coordinates, address, name of the account holder, and/or the MSID of the M2M device.

To control service authorization and provide programmed control for remote monitoring and control of utilities features, the carrier operating the wireless network 15 also operates a home location register (HLR) (not shown) that stores subscriber profiles and related call processing control information for each of that carrier's wireless subscribers and their associated mobile stations 21. Of note for purposes of this discussion, the HLR also stores relevant profiles or service control records, for the M2M devices 13a to 13e. The HLR may reside in the home message service center (MSC), however, in the example, the HLR 33 resides in a centralized node sometimes referred to as a service control point (SCP). For purposes of the SMS communications, an HLR stores for each M2M device 13a to 13e registered therewith, the subscriber's MSID (e.g., MDN or MIN), as well as other features. One aspect of noiinal HLR processing of an incoming SMS call involves translation of the MDN associated with the call into the M1N, for use in completing the call to the mobile station 101. For each M2M device 13a to 13e, the HLR also stores data identifying the current point of attachment of each M2M device 13a to 13e to the network. The HLR also acts as a message service center (MSC) that routes the text messages to and from the base station 17. In a network of the type shown in FIG. 1, the information identifies the MSC at which the mobile station 21 most recently registered. The network uses the MSC address information to route the SMS message through to the respective M2M device 13a to 13e at its location.

MDN is the telephone number of M2M device 13a to 13e served through the mobile communication network 15. For example, text messages intended for a mobile station 21 use the M2M device's MDN as a destination address. For outgoing messages (e.g., SMS text messages) from an M2M device, the MDN is used during procedures to authenticate the M2M device and/or to determine if the subscriber is authorized to use the particular service through the network 15. For example, the authentication is provided by an authentication server (not shown). In this regard, the M2M device registers with the network 15, and the network 15 authenticates the M2M device, e.g. to check that the M2M device has a valid MSID (e.g., MDN, M1N, or the like). As discussed above, each M2M device 13a to 13e is assigned to a specific home/location (e.g., 24a to 24e). Before the application server 26 accepts the remote reading of an M2M device (13a to 13e), it correlates the MSID with a geographic determination to confirm that the M2M device is located in the right home/location (e.g., 24a to 24e).

In one example, the application server 26 correlates the MSID number with the GPS information obtained from the GPS receiver of the respective M2M device (e.g., 13a to 13e). For example, for each M2M device (13a to 13e) the application server 26 has an MSID number, customer information, and location information (e.g., 24a to 24e) stored (i.e., pre-programmed) in a memory of the application server 26. The application server determines whether the GPS coordinates provided by the respective GPS receiver of M2M device (13a to 13e) are within a threshold distance from the pre-programmed location stored in the memory of the application server 26 associated with the MSID number of the M2M device (13a to 13e). In one example, the pre-programmed location stored in the memory of the application server 26 is identical to the pre-programmed location stored in the memory of the respective M2M device (13a to 13e). In one example, if the GPS coordinates provided by the GPS receiver of an M2M device are not within a threshold distance from the pre-programmed location stored in the memory of the application server 26, then the application server 26 sends a message to the respective M2M device to activate a visual display (e.g., blinking LED) on (or near) the M2M device indicating a problem with the location of the M2M device.

It should be noted that the remote reading may be either through a push or pull operation. For example, the M2M device (e.g., 13a to 13e) may itself initiate the transmission of the utility information to the application server 26. In another example, the application server 26 automatically requests the data to be transmitted by the M2M device at a predetermined period or when a predetermined criterion is met. In one embodiment, a predetermined criterion may be met when an owner of the utility account requests a status update from the application server 26 (or a web server 43 discussed below).

By way of example, consider that the M2M device 13a is installed in a correct location 24a. When the utilities information is sent to the application server 26 with the MSID number and the GPS location, the network 15 initially determines whether the MSID number is authorized to use the network 15. Next the application server correlates the MSID number with a stored account, which includes the subscriber information (e.g., name, address, etc.). The application server 26 determines whether the GPS coordinates received from the GPS receiver of the M2M device are within a predetermined distance (e.g., 50 meters) from the address/location stored in the memory of the application server 26. In one embodiment, the predetermined distance is different for different geographic locations, e.g., urban vs. rural areas, or different blocks within a city. For example, in an urban area the predetermined distance may be set to 10 m or the tolerance of the GPS receiver of the M2M device. In rural areas, on the other hand, the predetermined distance may be set to 100 m or more. In yet another embodiment, for WiFi enabled M2M devices 13, cell tower triangulation can be used in places with weak GPS signals.

Upon confirmation, the application server 26 then performs (or accepts) the remote metering operation. For example, the correlation of the MSID number with the GPS location may be performed by the application server 26 instead of or in addition to the correlation performed by the M2M device (e.g. 13a) itself Both correlations may be performed to provide a higher degree of confidence that the M2M device is installed at the correct location. In one example, when both correlations are performed, and either correlation indicates that the determined distance is above its respective threshold, then it is interpreted as an error by the application server 26.

Figure 3:
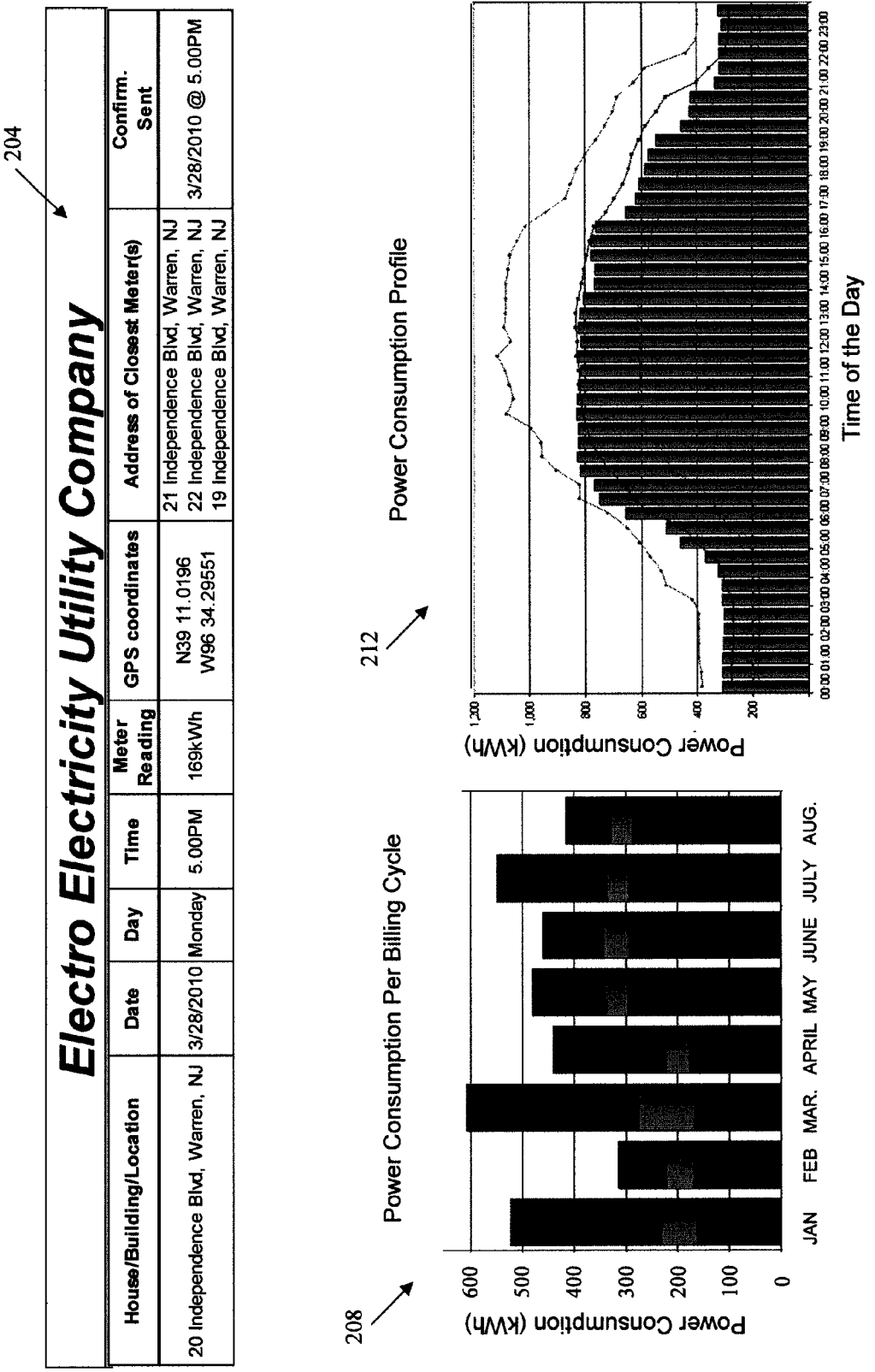
FIG. 3 illustrates an example of an output providing utility usage information.

Application server 26 may be a third party server performing remote utility reading for one or more utility companies, or it may be part of a server of the utility provider itself. In one example, one or more additional servers, such as an account web server 43, are used to provide additional services to an account holder. Although a single server 43 is shown in FIG. 1, a large utility may have a number of such servers. Account web server 43 may store account information associated with each M2M device, including utility usage information. By way of example, FIG. 3 illustrates a simplified spreadsheet output 204 as well as several graphs and charts (e.g., 208 and 212) for an account. An account holder has access to this information. Further, an account holder may specify on the account web server 43 notification requests the account holder would like to receive. The notification requests may be in connection with account usage, including preset usage limits. For example, the account holder or utility provider may specify on the account web server 43 that a notification message should be sent to an e-mail account associated with an M2M device (e.g., 13a) when one or more predetermined criterion is met. Such notification may be read on a terminal 31 through the internet 29. For example, a predetermined criterion may be the amount of usage of water, gas, electricity, etc. in a cycle, or the rate of usage at any given time. Thus, a notification may be provided by the account web server 43 to an e-mail account of a subscriber associated with an M2M device (e.g., 13a) when a predetermined criterion (e.g., threshold) is met, such as exceeding 2000 Kwatt-hours per month (i.e., for a billing cycle), or exceeding 100 gallons/hour (i.e., for indicating a leak).

In one example, the customer account web server 43 also offers its subscribers on-line access to a variety of functions related to the subscribers' accounts, such as review of billing statements and utility data, on-line payment, service changes, password control, trigger alerts, or the like. FIG. 3 illustrates some of these services and features. The utility provider in our example operates the customer account web server 43, thereby providing a subscriber interface via the Internet 29. Hence, an account holder's terminal, such as PC 31, may be used to access on-line information about a subscriber's account, which the utility provider makes available via a web site accessible through the Internet 29.

In one example, the customer account web server 43 provides utility usage information in real time. In this regard, the respective M2M device (e.g., 13a) is remotely read at a frequent period (e.g., every 2 minutes) in order to provide a "real time" assessment of the usage of one or more utilities to an account holder. For example, an account holder can monitor the rate of energy consumption after an air conditioner is turned on. The default period may be set by the utility service provider or by the third party server performing remote utility reading for one or more utility companies. The account holder can change this period by accessing their account at the web server 43 through a terminal 31.

Figure 4:
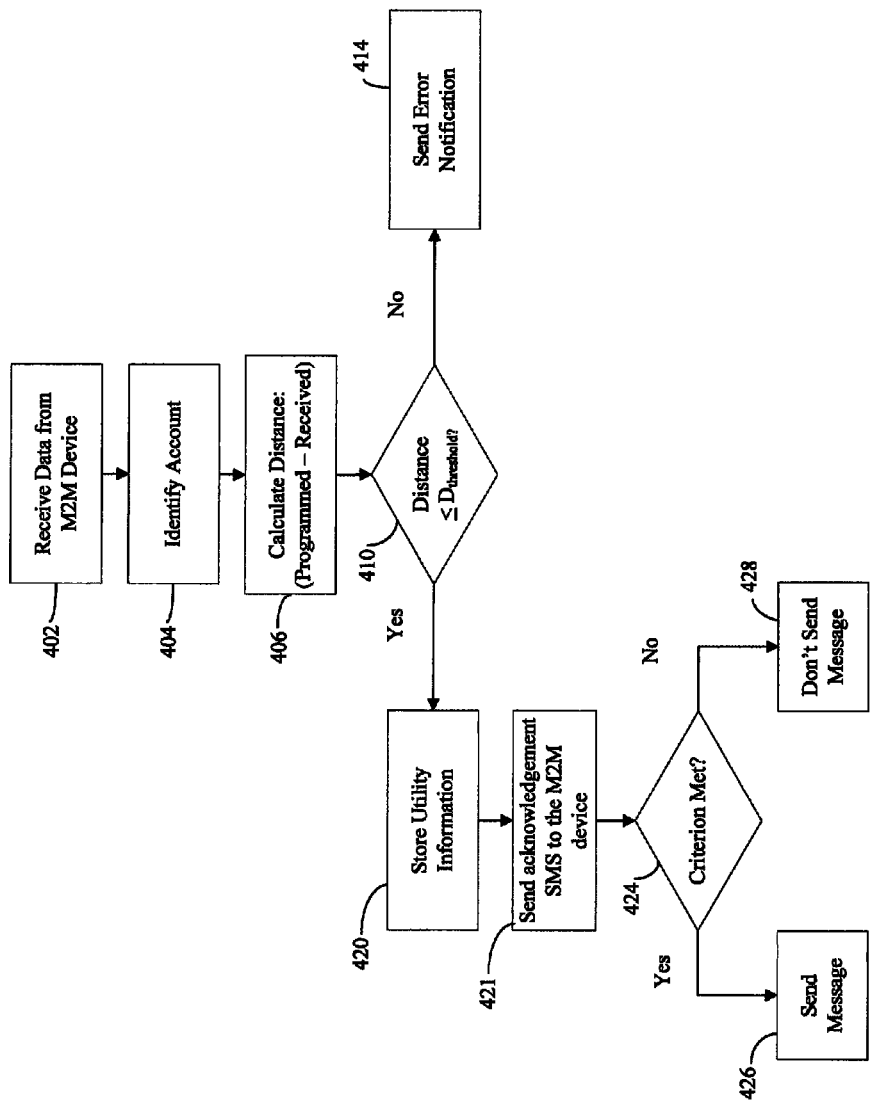
FIG. 4 is an exemplary flow chart illustrating M2M communication between an M2M device and a server.
Figure 5:
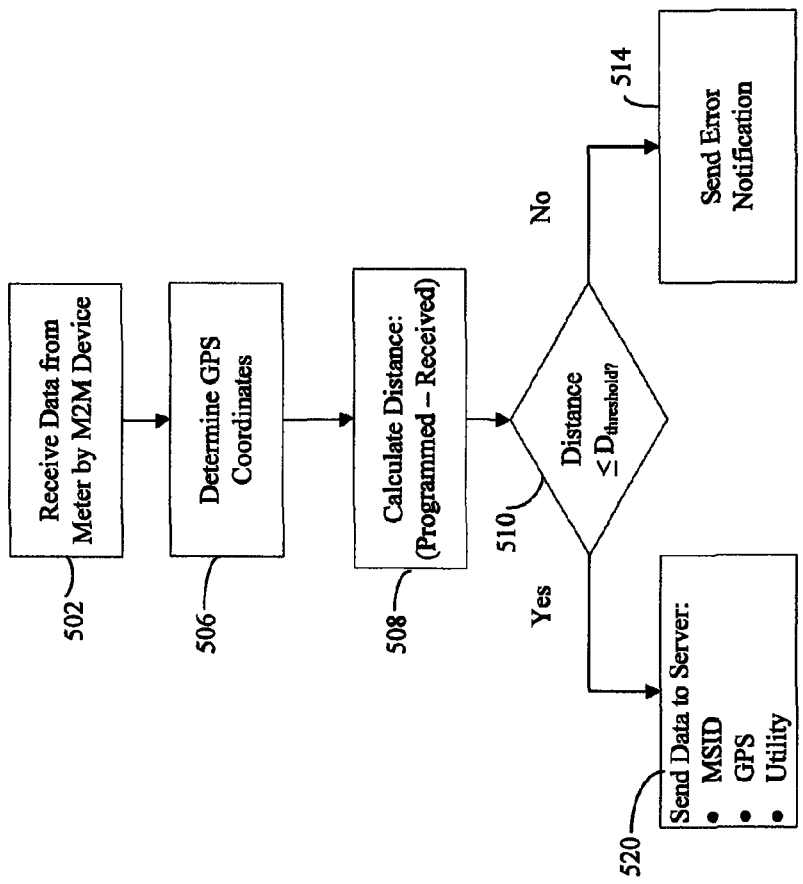
FIG. 5 is another exemplary flow chart illustrating M2M communication between an M2M device and a server.

FIGS. 4 and 5 provide exemplary flow charts illustrating M2M communication between an M2M device and a server. In step 402 of FIG. 4, a data message is received by the server from the M2M device over a mobile communication network. The data includes an MSID number of the M2M device; coordinates of the M2M device, which are determined via GPS; and information regarding usage of a utility, obtained by the M2M device. In step 404, the utility account is identified based on the MSID number. In step 406 the distance between a pre-programmed location of the M2M device stored in the memory associated with the server and the coordinates received from the M2M device is calculated. In step 410, a determination is made by the application server whether the calculated distance is within a predetermined distance threshold. If outside the threshold, an error notification is sent to the technician and/or M2M device (i.e., step 414). If within the predetermined threshold, then in step 420 the utility usage information is stored in a record for the identified utility account in a memory associated with the server. In one embodiment, in step 421 an acknowledgement message (e.g., SMS) is sent to the M2M device that sent the message in step 402.

As discussed above, the server can also be configured to analyze the results of the utility usage information and determine whether they meet stored predetermined criteria (provided either by the account holder or the utility provider). For example, in step 424 the server determines whether a predetermined criterion is met. If a criterion is met, in step 426 a message is sent to the account holder. For example, the message may be an e-mail message or a text message to an e-mail or telephone number that is on file in the application server.

The method of claim 1, further comprising providing notifications to an account holder based on a predetermined criterion provided by at least one of (i) the account holder or (ii) a utility provider.

FIG. 5 is an exemplary flow chart from the perspective of the M2M device. In step 502, an M2M device associated with a utility account obtains information regarding usage of the utility from a meter. In step 506, the M2M device determines the coordinates of its location via GPS. In step 508, the distance between a pre-programmed location of the M2M device (stored in the memory of the M2M device) and the received GPS coordinates is calculated. In step 510, the M2M device determines whether the determined GPS coordinates are within a threshold distance of pre-programmed coordinates for an intended location of the M2M device. If beyond the threshold, in step 520, an error notification is sent to the server over a mobile communication network The error notification includes the MSID number. If within the threshold, then the M2M device sends one or more of the following to the server: (i) a Mobile Station Identifier (MSID) number of the M2M device; (ii) GPS coordinates of the M2M device determined by the M2M device; and (iii) utility usage information.

FIGS. 6 and 7 provide functional block diagram illustrations of general purpose computer hardware platforms. FIG. 6 illustrates a network or host computer platform, as may typically be used to implement a server. FIG. 7 depicts a device with user interface elements, as may be used to implement a personal computer or workstation or to implement an M2M device discussed herein, although the device of FIG. 7 may also act as a server if appropriately programmed. It is believed that the general structure and general operation of such equipment as shown in FIGS. 6 and 7 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run, for example, application server(s) 26 and customer account web server(s) 43 in FIG. 1.

A user terminal such as a general-purpose personal computer comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g. files used for the user applications, and/or pull client application. The software code is executable by the M2M device. In operation, the code is stored within the M2M device. At other times, however, the software may be stored at other locations and/or transported for loading into the appropriate M2M device system. Execution of such code by a processor of the M2M device enables the M2M device to implement respective aspects of the remote utility monitoring, in essentially the manner performed in the implementations discussed and illustrated herein. In other embodiments, the software may be stored at the application server, which pulls utilities information from the respective M2M devices.

Hence, aspects of the methods of remote utility monitoring outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP—Third Generation Partnership Project
3GPP2—Third Generation Partnership Project 2
AMS—Advanced Metering System
BDA—Bi-Directional Amplifier
BS—Base Station
BTS—Base Transceiver Station
CDMA—Code Division Multiple Access
CPU—Central Processing Unit
EEPROM—Electrically Erasable Programmable Read Only Memory
EPROM—Erasable Programmable Read Only Memory
GPS—Global Positioning System
GSM—Global System for Mobile Communications
HLR—Home Location Register
IEEE—Institute of Electrical and Electronic Engineers
IMSI—International Mobile Station Identifier
IC—Integrated Circuit
IP—Internet Protocol
LAN—Local Area Network
LTE—Long Term Evolution
MCU—Micro Control Unit
M2M—Machine to Machine
MDN—Mobile Directory Number
MIN—Mobile Identification Number
MSID—Mobile Station Identifier
MSC—Mobile Switching Center
MTN—Mobile Telephone Number
PC—Personal Computer
PDN—Public Data Network
PROM—Programmable Read Only Memory
PSTN—Public Switched Telephone Network
RAM—Random Access Memory
RAN—Radio Access Network
ROM—Read Only Memory
RF—Radio Frequency
SCP—Service Control Point
SMS—Short Message Service
SMSC—Short Message Service Center
UMTS—Universal Mobile Telecommunications System
WAN—Wide Area Network

What is claimed is:

1. A method comprising steps of:
receiving at a server a data message from a machine-to-machine (M2M) device over a mobile communication network, wherein the data message received from the M2M device includes:
a Mobile Station Identifier (MSID) number of the M2M device;
coordinates of the M2M device determined by the M2M device via global positioning system (GPS); and
information regarding usage of a utility, obtained by the M2M device;

identifying a utility account based on the MSID;
calculating a distance between a pre-programmed location of the M2M device stored in a memory associated with the server and the coordinates received from the M2M device; and
storing the utility usage information in a record for the identified utility account in a memory associated with the server in response to determining that the calculated distance is within a predetermined distance threshold; and
providing notifications to an account holder based on a predetermined criterion provided by at least one of (i) the account holder or (ii) a utility provider, including by:
determining whether the predetermined criterion is met; and
upon determining that the predetermined criterion is met, sending one of at least (i) an e-mail, or (ii) a text message notification to the account holder,
wherein: the notification indicates that the predetermined criterion is met, and
the predetermined criterion is an amount of usage of water, gas, or electricity in a utility cycle or a rate of usage of water, gas, or electricity.

2. The method of claim 1, wherein the data message is sent from the M2M device through the mobile communication network as an SMS message.

3. The method of claim 1, wherein the data message from the M2M device further includes an address of the M2M device.

4. The method of claim 1, wherein the MSID number is a mobile directory number (MDN) assigned to the M2M device for communications through the mobile communication network.

5. The method of claim 1, wherein the server is a third party server performing remote utility reading for one or more utility companies.

6. The method of claim 1, wherein the server is further configured to provide the utility account information to the account holder through an internet.

7. The method of claim 6, further comprising updating account information in real time based on a specified period, wherein the specified period is a predetermined criterion.

8. The method of claim 7, wherein the period is 2 minutes.

9. The method of claim 1, further comprising:
notifying a technician assigned to an area corresponding to the received GPS coordinates by at least one of (i) a text message, (ii) an e-mail, (iii) or a calendar entry, indicating that an error has occurred, in response to at least one of:
(i) determining the calculated distance is not within the predetermined distance threshold; or
(ii) receiving an error notification from the M2M device.

10. The method of claim 1, further comprising sending an acknowledgment to the M2M device that the data message is received at the server.

11. A server computer system, comprising:
a processor;
a network interface coupled to the processor configured to enable communications via a mobile communication network;
a storage device for content and programming, accessible by the processor;
a program stored in the storage device, wherein execution of the program by the processor configures the system to perform functions, including functions to:
receive a data message from a machine-to-machine (M2M) device over a mobile communication network, wherein the data message received from the M2M device includes:
a Mobile Station Identifier (MSID) number of the M2M device;
coordinates of the M2M device determined by the M2M device via global positioning system (GPS); and
information regarding usage of a utility, obtained by the M2M device;
identify a utility account based on the MSID;
calculate a distance between a pre-programmed location of the M2M device stored in a memory associated with the server and the coordinates received from the M2M device; and
store the utility usage information in a record for the identified utility account in a memory associated with the server in response to determining that the calculated distance is within a predetermined distance threshold; and
provide notifications to an account holder based on a predetermined criterion provided by at least one of (i) the account holder or (ii) a utility provider, including by:
determining whether the predetermined criterion is met; and
upon determining that the predetermined criterion is met, sending one of at least (i) an e-mail, or (ii) a text message notification to the account holder,
wherein: the notification indicates that the predetermined criterion is met, and
the predetermined criterion is an amount of usage of water, gas, or electricity in a utility cycle or a rate of usage of water, gas, or electricity.

12. The system of claim 11, wherein the data message from the M2M device is an SMS message.

13. The system of claim 11, wherein the data message from the M2M device further includes an address location of the M2M device.

14. The system of claim 11, wherein the MSID number is a mobile directory number (MDN) assigned to the M2M device for communications through the mobile communication network.

15. The system of claim 11, wherein the one or more servers are one or more third party servers performing remote utility reading for one or more utility companies.

16. The system of claim 11, wherein the one or more servers include a web server configured to provide notifications based on one or more predetermined criterion provided by at least one of (i) an account holder or (ii) utility provider.

17. The system of claim 16, wherein execution of the program by the processor further configures the system to perform functions to:
determine whether the predetermined criterion is met; and
upon determining that the predetermined criterion is met, send an e-mail notification to the account holder.

18. The system of claim 16, wherein the web server is further configured to provide the utility account information to the account holder through an internet.

19. The system of claim 18, wherein execution of the program by the processor further configures the system to perform functions to update account information in real time based on a specified period, wherein the specified period is a predetermined criterion.

20. The system of claim 19, wherein the period is 2 minutes.

21. The system of claim 11, wherein execution of the program by the processor further configures the system to perform functions to:
- notify a technician assigned to an area corresponding to the received GPS coordinates by at least one of (i) a text message, (ii) an e-mail, (iii) or a calendar entry, indicating that an error has occurred, in response to at least one of:
  - (i) determining the calculated distance is not within the predetermined distance threshold; or
  - (ii) receiving an error notification from the M2M device.

22. The system of claim 11, wherein execution of the program by the processor further configures the system to perform functions to:
- send an acknowledgment to the M2M device that the data message is received at the server.

* * * * *